UNITED STATES PATENT OFFICE.

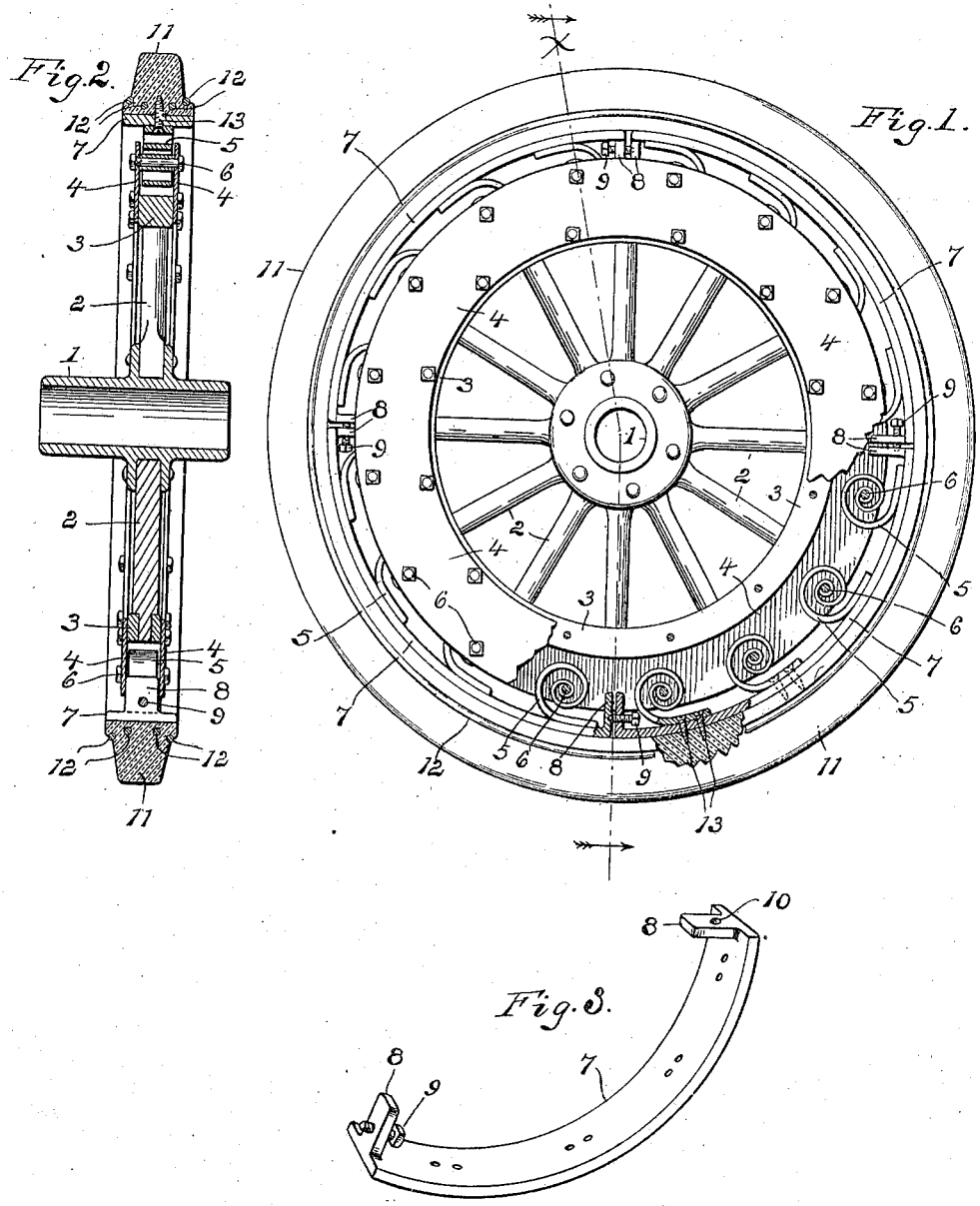

LOUIS BLESSING, OF JACKSON, MICHIGAN.

SPRING-WHEEL.

963,742.   Specification of Letters Patent.   Patented July 12, 1910.

Application filed July 31, 1908. Serial No. 446,214.

*To all whom it may concern:*

Be it known that I, LOUIS BLESSING, a citizen of the United States of America, residing at Jackson, in the county of Jackson and State of Michigan, have invented certain new and useful Improvements in Spring-Wheels, of which the following is a specification, reference being had therein to the accompanying drawings.

This invention relates to improvements in vehicle wheels and more particularly to a resilient sectional rim for spring wheels.

The object of the invention is to provide a rim so constructed that it may be inserted within a continuous, solid tire and then expanded to fit within the tire and hold the same in place and a further object of the invention is to provide a resilient rim to which the tire is adapted to be directly attached which will yield when passing over obstructions and thus aid in absorbing vibrations.

To this end the invention consists in the construction substantially as shown and particularly pointed out in the claims, reference being had to the accompanying drawings in which—

Figure 1 is a side elevation of a vehicle wheel embodying the invention with parts broken away to show the construction; Fig. 2 is a section of the same substantially on the line *x*—*x* of Fig. 1; and Fig. 3 is a detached perspective view of one of the sections of the rim.

The spring wheel to which this invention is applied is substantially the same as that shown in my application for Letters Patent dated February 4, 1908, Serial Number 414,174 and consists of a hub-portion 1, spokes 2, carrying a felly 3 to the sides of which are bolted wide annular flange-plates 4. Between the projecting edges of the flanges are secured a series of volute springs 5, each held by a bolt 6 passing through the flanges and through the center of the spring. These springs are preferably tapered in thickness and their outer thick, heavy ends are secured to the sectional rim 7 embodying this invention.

The rim 7 consists of a plurality of segmental sections, preferably four or more, of spring steel. Upon each end of each section is an inwardly extending lug 8, which lugs when the rim is in place, project inwardly such a distance that they engage between the flanges 4 and the rim is thus guided and held in place against lateral movement by said flanges. The lug 8 at one end of each section of the rim is provided with a screw-threaded opening to receive a set-screw 9 and the lug at the opposite end of the section is provided with a counter-sink 10 in its outer face to receive the end of the bolt 9 on the adjacent section. 11 is a continuous, solid rubber tire having embedded therein for the purpose of strengthening the tire and preventing its stretching, a plurality of steel wire hoops 12.

In assembling, the tire is slipped upon the rim 7 with the rim in its contracted position, *i. e.*, with the ends of the sections close together and then the set-screws 9 are turned in, forcing the sections apart and expanding the rim within the tire until it fits closely therein thus permitting the use of a continuous, solid tire having reinforced hoops to prevent its stretching. The several springs are secured to the rim 7 by screws 13 passing through the thickened end of the spring and through the rim into the tire a short distance. These screws thus hold the spring to the rim and the rim to the tire, and prevent the tire from creeping upon the rim or moving laterally.

By the use of a sectional, expansible rim a new tire may be easily and quickly put on and a tighter fit between the rim and tire may be secured than with a continuous rim. When from use the tire becomes somewhat worn and its inner diameter thus somewhat increased, the sectional rim may be further expanded to closely engage the tire and the wearing away of the tire is greatly lessened by thus keeping it tight upon its rim.

By making the rim of spring steel sections it will yield very perceptibly when the wheel passes over an obstruction and thus aid the springs in preventing the transmission of the consequent jolt or vibration to the axle.

Having thus fully described my invention what I claim is:—

1. A vehicle wheel comprising an inner rigid portion, an outer rim formed of spaced segmental sections, springs secured to said sections and inner portion to connect the same, a continuous tire engaging the outer side of the sections, and means carried by the ends of the sections connecting the same for conjoint movement and for spreading the sections apart to expand the outer rim within the tire and hold said tire in place.

2. A vehicle wheel comprising an inner rigid portion, an outer rim consisting of segmental sections, each section being provided with an inwardly extending portion at each end, a set screw extending through one of said portions on each section into engagement with the portion on the adjacent section to spread the sections apart and hold the same spread, a continuous tire engaging the sections and springs secured to the sections and the inner portion of the wheel to permanently connect the same.

3. In a vehicle wheel, the combination with an inner felly, flanges secured to the sides of said felly, and springs between the flanges attached thereto at one end; of a rim consisting of segmental sections to which the other end of the springs is secured, lugs on the ends of said rim sections extending inwardly between the wheel flanges, means carried by the lugs for forcing and holding the rim sections apart to increase the diameter of the rim and a continuous tire engaging the sections.

4. In a vehicle wheel, the combination of an inner felly, flange-plates secured to the sides of said felly, volute springs secured at one end between the projecting edges of said flanges, a continuous tire, a rim consisting of a series of segmental sections, screws securing the outer ends of the springs to said rim sections and extending through said rim into the tire, a lug on each end of each rim section, a set-screw engaging a screw-threaded opening in one of the lugs of each section and adapted to be turned into engagement with a lug of the next section to force said sections apart and expand the rim within the tire.

In testimony whereof I affix my signature in presence of two witnesses.

LOUIS BLESSING.

Witnesses:
J. J. BENNETT,
B. F. CHASE.